United States Patent
Dippold et al.

(10) Patent No.: US 10,125,850 B2
(45) Date of Patent: Nov. 13, 2018

(54) ROLLER DEVICE FOR A TRACTION MECHANISM DRIVE OF A MOTOR VEHICLE

(71) Applicant: Schaeffler Technologies GmbH & Co. KG, Herzogenaurach (DE)

(72) Inventors: Oliver Dippold, Forchheim (DE); Ralf Wagner, Obermichelbach (DE); Armin Gerner, Pommersfelden (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 437 days.

(21) Appl. No.: 14/276,221

(22) Filed: May 13, 2014

(65) Prior Publication Data

US 2014/0349804 A1    Nov. 27, 2014

(30) Foreign Application Priority Data

May 21, 2013    (DE) .......................... 10 2013 209 290

(51) Int. Cl.
*H02K 49/04*    (2006.01)
*F02B 67/06*    (2006.01)
(Continued)

(52) U.S. Cl.
CPC ........... *F16H 13/02* (2013.01); *H02K 49/043* (2013.01); *H02K 49/046* (2013.01);
(Continued)

(58) Field of Classification Search
CPC ....... F16H 13/02; F16H 55/36; H02K 49/043; H02K 49/046; H02K 49/106;
(Continued)

(56) References Cited

U.S. PATENT DOCUMENTS 2,768,316 A * 10/1956 Neiss ................... H02K 49/108
                                                         123/41.11
3,374,375 A *  3/1968 Cook ...................... H02K 49/04
                                                         310/103
(Continued)

FOREIGN PATENT DOCUMENTS

CN    102270911    12/2011
DE     19727914     1/1999
(Continued)

OTHER PUBLICATIONS

English machine translation of DE 934296; Oct. 1995; Baermann Max.*

(Continued)

*Primary Examiner* — Bernard Rojas
*Assistant Examiner* — Ahmed Elnakib
(74) *Attorney, Agent, or Firm* — Volpe and Koenig, P.C.

(57) ABSTRACT

A roller device for a traction mechanism drive of a motor vehicle, with a roller element for introducing a torque provided via the traction mechanism and a driven shaft for driving an auxiliary unit. The roller device has a magnetic coupling for non-positive torque transfer between the roller element and the driven shaft. The magnetic coupling has a primary-side unit connected to the roller element with a primary magnetic element and a secondary-side unit connected to the driven shaft with a secondary-side magnetic element. The magnetic elements are permanent and/or electromagnetic elements. The non-positive torque transfer is realized by magnetic fields of the primary-side and secondary-side magnetic elements. At least one magnetic element of the two units for changing the magnetic field overlap of the magnetic fields of the primary-side and secondary-side magnetic elements is movably arranged within its unit. A (Continued)

corresponding traction mechanism drive and method are provided.

10 Claims, 3 Drawing Sheets

(51) Int. Cl.
    *F16H 13/02*     (2006.01)
    *H02K 49/10*     (2006.01)
    *F16H 55/36*     (2006.01)
    *H02K 21/02*     (2006.01)

(52) U.S. Cl.
    CPC ......... *H02K 49/106* (2013.01); *H02K 49/108* (2013.01); *F16H 55/36* (2013.01); *H02K 21/023* (2013.01); *H02K 21/024* (2013.01); *H02K 2213/09* (2013.01)

(58) Field of Classification Search
    CPC .. H02K 49/108; H02K 21/023; H02K 21/024; H02K 2213/09
    USPC ............. 310/92, 95, 103, 105, 209; 192/222
    See application file for complete search history.

(56) References Cited

U.S. PATENT DOCUMENTS

| | | | | |
|---|---|---|---|---|
| 5,158,279 A | * | 10/1992 | Laffey | B65H 3/5261 192/110 R |
| 5,477,093 A | * | 12/1995 | Lamb | H02K 49/046 310/75 D |
| 5,691,587 A | * | 11/1997 | Lamb | H02K 49/046 192/80 |
| 5,739,627 A | * | 4/1998 | Lamb | H02K 49/046 310/103 |
| 5,834,872 A | * | 11/1998 | Lamb | H02K 49/046 310/103 |
| 6,194,802 B1 | * | 2/2001 | Rao | H02K 21/024 310/191 |
| 6,582,333 B2 | | 6/2003 | Man et al. | |
| 7,528,514 B2 | * | 5/2009 | Cruz | F16D 27/01 310/103 |
| 7,948,141 B2 | * | 5/2011 | Takeuchi | H02K 21/026 310/103 |
| 2005/0275359 A1 | * | 12/2005 | Takeuchi | H02K 16/005 318/400.02 |
| 2008/0105503 A1 | * | 5/2008 | Pribonic | H02K 49/046 188/267 |
| 2010/0289359 A1 | * | 11/2010 | Knaian | H02K 21/04 310/83 |
| 2014/0375159 A1 | * | 12/2014 | Dippold | H02K 49/108 310/95 |

FOREIGN PATENT DOCUMENTS

| | | | |
|---|---|---|---|
| DE | 10148961 | | 4/2002 |
| GB | 765586 | * | 1/1957 |
| GB | 2430750 | * | 4/2007 |
| WO | 8806233 | | 8/1988 |

OTHER PUBLICATIONS

Chinese Office Action of Application No. 201410216099.9 dated Aug. 29, 2017.

* cited by examiner

ROLLER DEVICE FOR A TRACTION MECHANISM DRIVE OF A MOTOR VEHICLE

INCORPORATION BY REFERENCE

The following documents are incorporated herein by reference as if fully set forth: German Patent Application No. 102013209290.3, filed May 21, 2013.

FIELD OF THE INVENTION

The invention relates to a roller device for a traction mechanism drive of a motor vehicle, with a roller element for introducing a torque provided via the traction mechanism of the traction mechanism drive and a driven shaft for driving an auxiliary unit of the motor vehicle.

From the document DE 101 48 961 A1, a traction mechanism drive formed as a belt drive is known with a roller element formed as an input belt pulley for driving auxiliary units, wherein this drive is connected via a planetary drive to a crankshaft of the internal combustion engine, wherein different auxiliary units can be driven by output belt pulleys via the traction mechanism driven by the belt pulley. In addition, by use of another output belt pulley, an electric machine is also connected to the traction mechanism, in order to generate, in the generator mode, electrical energy from the mechanical energy of the traction mechanism or to be able to provide additional torque to the traction mechanism in the motor mode.

SUMMARY

The objective of the invention is to provide measures that allow a variable and safe drive of auxiliary units via a traction mechanism drive.

This objective is met according to the invention by a roller device, a traction mechanism drive, and also by a method for driving an auxiliary unit connected via a roller device having one or more features of the invention. Preferred constructions of the invention are disclosed below and in the claims.

According to the invention, a roller device for a traction mechanism drive of a motor vehicle is provided that has the following components: (a) a roller element for introducing a torque provided by the traction mechanism of the traction mechanism drive, (b) a driven shaft for driving an auxiliary unit of the motor vehicle, (c) a magnetic coupling for the non-positive torque transfer between the roller element and the driven shaft, wherein the magnetic coupling has a primary-side unit connected to the roller element with at least one primary magnetic element and a secondary-side unit connected to the driven shaft with at least one secondary-side magnetic element. The magnetic elements are permanent magnets and/or electromagnetic elements. The non-positive torque is transferred via the magnetic fields of the primary-side and secondary-side magnetic elements, wherein at least one magnetic element of the two units is arranged so that it is displaceable within its unit for changing the magnetic field overlap of the magnetic fields of the primary-side and secondary-side magnetic elements. The displaceability of the at least one magnetic element produces the ability to realize a high torque and rotational speed variance on the driven section. Advantageously all of the magnetic elements of at least one of the two units for changing the magnetic field overlap of the magnetic fields of the primary-side and secondary-side magnetic elements are arranged so that they are displaceable within this unit.

According to one preferred embodiment of the invention it is provided that the displaceability of the at least one magnetic element has a radial displaceability or has at least a radial component.

Alternatively or additionally it is advantageously provided that the displaceability of the at least one magnetic element is an axial displaceability or has at least an axial component.

According to another preferred embodiment of the invention, the at least one displaceable magnetic element is a permanent magnetic element. Alternatively it is provided that the at least one displaceable magnetic element is an electromagnetic element.

In one advantageous construction of the invention, the roller device has at least one actuator device for displacing the at least one displaceable magnetic element. In one advantageous improvement of this construction of the invention, the roller device further has at least one restoring element that acts against the actuator device for displacing the at least one displaceable magnetic element.

Advantageously the magnetic coupling is constructed as an eddy current coupling. Such a magnetic coupling can have an especially simple and robust construction.

The invention further relates to a traction mechanism drive for driving auxiliary units of a motor vehicle with an input roller element that can be connected to an engine shaft, in particular, crankshaft, of a motor vehicle engine, at least one output roller device coupled to the input roller element via a common traction mechanism for driving the associated auxiliary unit, in particular, a water pump, wherein at least one output roller device is constructed as a roller device that can be constructed and improved as described above. In other words, the invention relates to a use of the roller device as noted above in a traction mechanism drive of a motor vehicle for the purpose of outputting a portion of a torque provided by a motor vehicle engine for driving the motor vehicle to an auxiliary unit. Advantageously, in the traction mechanism drive there are several output roller devices, wherein, in particular, several, advantageously all of the output roller devices are constructed as the roller device described above.

The invention further relates to a method for driving an auxiliary unit connected via a roller device described above in a motor vehicle, in which the control and/or regulation of a nominal rotational speed of the drive shaft of the roller device is realized by a displacement of the at least one displaceable magnetic element. Through the displacement of the at least one displaceable magnetic element, a high torque and rotational speed variance is produced on the driven section. The method can be realized and improved, in particular, as explained above with reference to the roller device.

BRIEF DESCRIPTION OF THE DRAWINGS

The invention is explained below using examples with reference to the accompanying drawings, wherein the features described below can be aspects of the invention both individually and also in combination. Shown are.

DETAILED DESCRIPTION OF THE PREFERRED EMBODIMENTS

Figure 1:
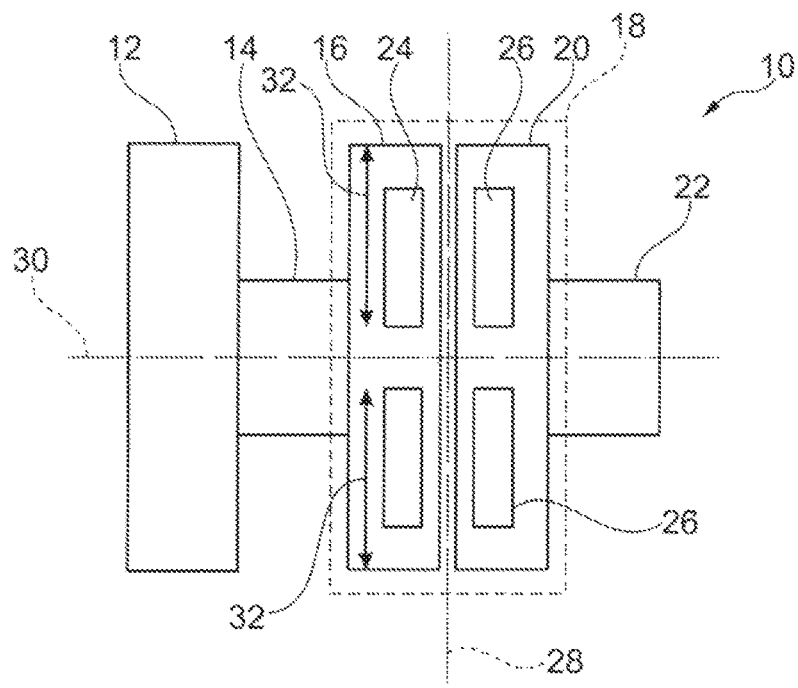
FIG. 1 is a schematic sectional view of a roller device with a magnetic coupling according to a preferred embodiment of the invention.

FIG. 1 shows a roller device 10 for a traction mechanism drive of a motor vehicle in a schematic sectional view. The roller device 10 has, on the input side, a roller element 12 for introducing a torque provided via the (not shown) traction mechanism of the traction mechanism drive. The traction mechanism can be, for example, a belt, chain, etc. The roller element 12 is connected locked in rotation via an input shaft 14 with a primary-side unit 16 of a magnetic coupling 18. A secondary-side unit 20 of the magnetic coupling 18 is connected on the output side locked in rotation with a driven shaft 22 of the roller device 10. The magnetic coupling 18 is thus a coupling for non-positive torque transfer between the roller element 12 and the driven shaft 22. The driven shaft 22 is a driven shaft 22 for driving a (not shown) auxiliary unit of the motor vehicle.

In each of the two units 16, 20 of the magnetic coupling 18 there is at least one magnetic element 24, 26. In the schematic diagram of FIG. 1 there are two primary magnetic elements 24 of the primary unit 16 and two secondary magnetic elements 26 of the secondary unit 20. The non-positive torque transfer is realized (at least in normal mode) via the magnetic fields of the primary-side and secondary-side magnetic elements 24, 26. The two units 16, 20 of the magnetic coupling 18 are supported so that they can rotate opposite each other within the roller device 10 and bring the primary magnetic elements 24 opposite the secondary magnetic elements 26 with respect to a plane 28 perpendicular to a common axis 30 of the shafts 14, 22.

While the secondary magnetic elements 26 are arranged fixed within their unit 20, the primary magnetic elements 24 are arranged so that they are displaceable within their unit 16 for changing the magnetic field overlap of the magnetic fields of the primary-side and secondary-side magnetic elements 24, 26 within their unit 16 (double arrow 32). More precisely, these displaceable magnetic elements 24 are arranged so that they are displaceable in the radial direction within their unit 16. The displacement of the displaceable magnetic field elements leads to a change in the magnetic field overlap of the magnetic fields of the primary-side and secondary-side magnetic elements 24, 26. This causes a change in the transmitted torque. The displacement of the displaceable magnetic elements (here the primary magnetic elements 24) can vary the rotational speed ω2 of the driven shaft 22 and the auxiliary unit connected to this shaft for an opposite rotational speed ω1 of the roller element 12 specified by the traction mechanism drive.

Figure 2A:
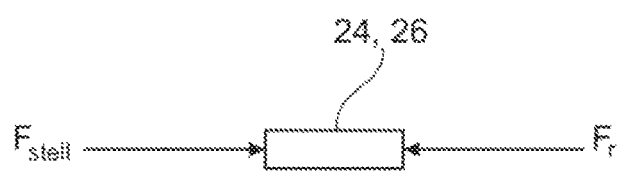
FIGS. 2A and 2B are diagrams for explaining the displacement of displaceable magnetic elements of the magnetic coupling.
Figure 2B:
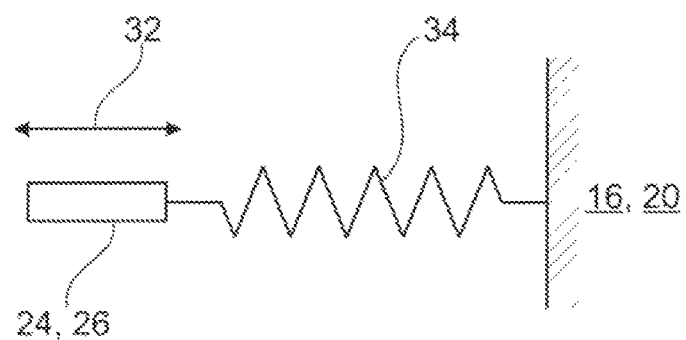

For displacing the displaceable magnetic field element 24, 26 or one of each of the displaceable magnetic field elements 24, 26, the corresponding unit 16, 20 has an actuator device indicated (but not shown) in FIGS. 2A and 2B. This generates an adjustment force $F_{stell}$. Usually the corresponding unit 16, 20 also has a restoring element 34 acting against the actuator device for the return displacement of the at least one displaceable magnetic element 24, 26. In a simple construction, this is located on the side of the displaceable magnetic element 24, 26 opposite the actuator device and generates a restoring force $F_r$. This situation is shown in FIG. 2A. The displacement of the magnetic element 24, 26 results from the superposition of the adjustment force and the restoring force.

FIG. 2B shows a simple example of a restoring element 34. This is formed as a spring element, more precisely, a helical spring. This helical spring acts as a compression spring and is supported with its end facing away from the magnetic element on a part of the corresponding unit 16, 20 of the magnetic coupling.

FIGS. 2A and 2B illustrate the principle of displacement or adjustment of displaceable magnetic elements 24, 26. One extreme position of the element 24, 26 is realized by the restoring element 34. By the use of the actuator device, the magnetic element 24, 26 can be moved or adjusted, wherein a rest position of the magnetic element 24, 26 is set by an equilibrium between the adjustment force and restoring force.

Figure 3:
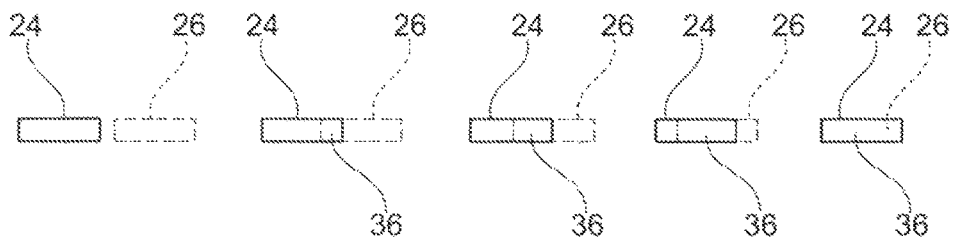
FIG. 3 is a schematic diagram of the changing overlap between the corresponding magnetic elements of the primary unit and secondary unit of the magnetic coupling.

In FIG. 3, different rest positions of the magnetic element 24, 26 are shown as examples. Here, the groupings at the far left and far right mark the extreme positions of the magnetic element 24, 26 at which the actuator device has a maximum effect and the restoring element 34 has maximum deflection or the actuator device is passive and the restoring element 34 is in the nominal position. For the effect of the eddy currents, the effective overlap area 36 is relevant. The greater this area is, the greater the effective torque and thus the lower the slippage between the roller element 12 and driven shaft 22.

Figure 4:
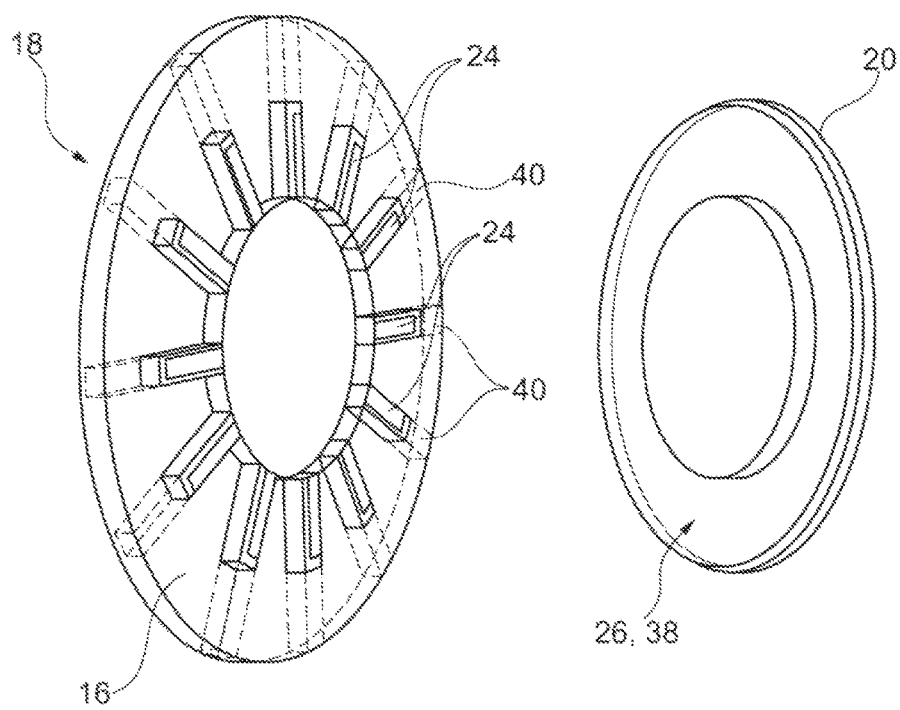
FIG. 4 is a view of a magnetic coupling formed as an eddy current coupling with primary magnetic elements that are displaceable in the radial direction in a first position.

FIG. 4 shows the units 16, 20 of a magnetic coupling 18 formed as an eddy current coupling with radially displaceable primary magnetic elements 24 in a first position. The single secondary magnetic element 26 is an electromagnetic element formed as a single, closed, ring-shaped conductor loop 38. The switching state shown in FIG. 4 for the coupling 18 is ON. This means a maximum field entrainment (eddy current) of the secondary magnetic element 26 of the secondary unit 20 by the primary magnetic elements 24 of the primary unit 16. This corresponds to the state on the right side in FIG. 3. The primary magnetic elements 24 are displaceable radially outward or inward in corresponding guide rails 40. The primary and secondary units 16, 20 of the magnetic coupling 18 are separated somewhat for better clarity in the figure. One useful implementation tries to keep the axial distance between the primary and secondary units 16, 20 as small as possible. In one variant, the primary and secondary units 16, 20 can be moved toward each other or away from each other in the axial direction.

Figure 5:
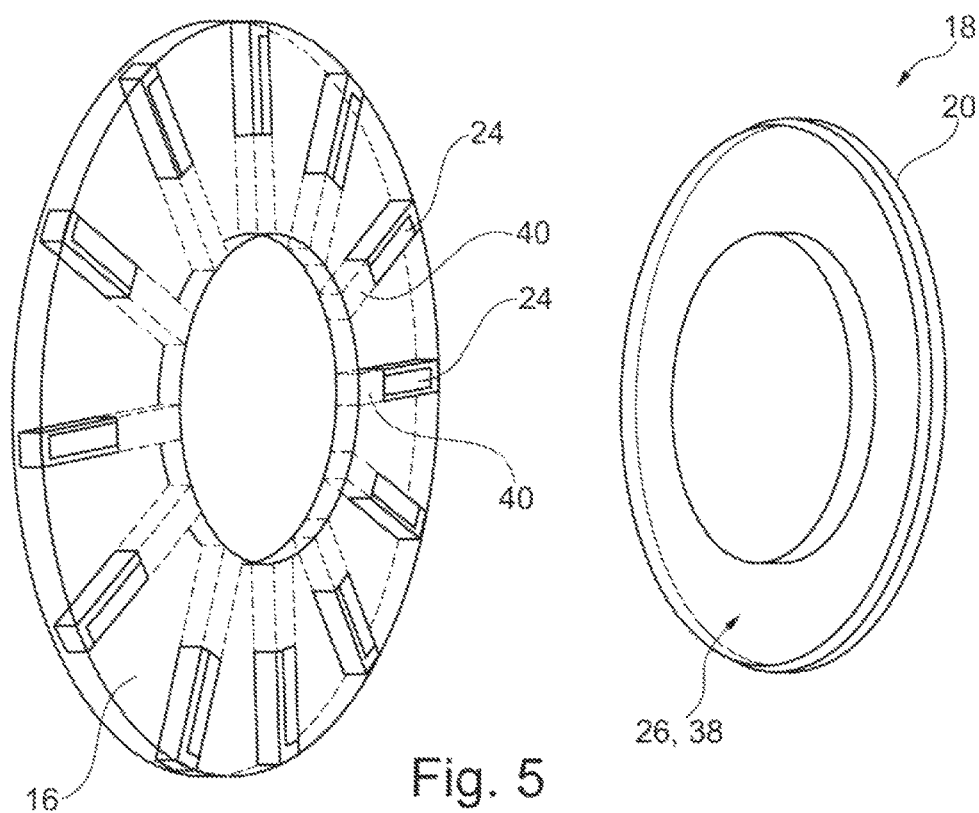
FIG. 5 is a view of a magnetic coupling formed as an eddy current coupling with primary magnetic elements that are displaceable in the radial direction in a second position.

FIG. 5 corresponds to the switching state OFF of the magnetic coupling 18 from FIG. 4. The magnetic elements 24 are at the maximum deflection via the mechanism described in FIGS. 2A and 2B, and there is a minimum overlap between the magnetic fields of the primary and secondary magnetic elements 24, 26.

Figure 6:
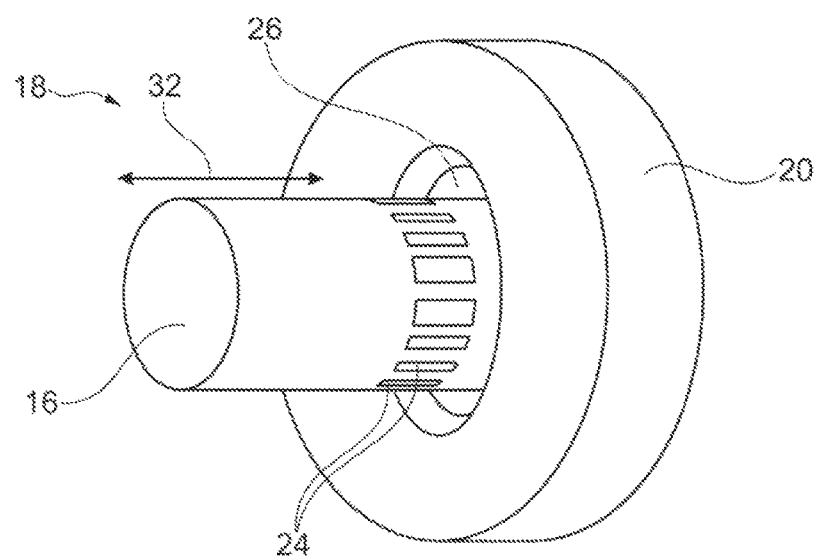
FIG. 6 is a view of a magnetic coupling with primary magnetic elements that are displaceable in the axial direction.

FIG. 6 shows a magnetic coupling 18 in which the magnetic elements 24, 26 of one unit 16, 20 are displaceable in the axial direction relative to the magnetic elements 26, 24 of the other unit 20, 16. The overlap of the magnetic fields of the primary and secondary magnetic elements 24, 26 can be set by an axial shift.

For all of the variants it is applicable that the primary and secondary units 16, 20 can be exchanged. Likewise, the adjustment mechanism described in FIGS. 2A and 2B can be inverted, i.e., the left or right extreme position can be achieved by the restoring element 34 or the actuator device.

The restoring element 34 can be any kind of mechanical (force/energy) accumulator, e.g., spring, helical spring, compression spring, tension spring, spiral spring, torsion spring, wrap spring, viscous spring, gas compression spring, air spring, elastomer spring, leaf spring, plate spring, torsion bar spring, cylindrical helical spring, conical helical spring, coil spring. Likewise, the (force/energy) accumulator can also have an electric, magnetic, electrostatic, pneumatic, hydraulic, thermal, or chemical construction.

LIST OF REFERENCE NUMBERS

10 Roller device
12 Roller element
14 Input shaft
16 Primary-side unit
18 Magnetic coupling
20 Secondary-side unit
22 Driven shaft
24 Primary magnetic element
26 Secondary magnetic element
28 Plane
30 Axis
32 Double arrow
34 Restoring element
36 Overlap area
38 Conductor loop
40 Guide rail

The invention claimed is:

1. A roller device for a traction mechanism drive of a motor vehicle, comprising:
   a roller element for introducing a torque provided by the traction mechanism of the traction mechanism drive,
   a driven shaft for driving an auxiliary unit of the motor vehicle, and
   a magnetic coupling for non-positive torque transfer between the roller element and the driven shaft,
   the magnetic coupling includes a primary-side unit connected to the roller element with at least one primary magnetic element and a secondary-side unit connected to the driven shaft with at least one secondary-side magnetic element,
   the magnetic elements are at least one of permanent magnetic or electromagnetic elements and the non-positive torque transfer is realized by the magnetic fields of the primary-side and the secondary-side magnetic elements,
   at least one of the magnetic elements of the two units is arranged to be movable within the respective primary-side or secondary-side unit for changing a magnetic field overlap of magnetic fields of the primary-side and secondary-side magnetic elements,
   wherein the at least one of the magnetic elements is movable in a first direction via an adjustment force applied by an actuator device and in an opposite direction via a restoring force applied by a restoring element, the restoring force increasing an amount of overlap of the magnetic fields of the primary-side and secondary-side magnetic elements,
   wherein a rest position of the magnetic elements is set by an equilibrium between the adjustment force and the restoring force, and
   wherein the at least one of the magnetic elements that is movable has a radial displaceability or has a displaceability with at least a radial component, the respective primary-side or secondary-side unit having a guide rail for the at least one of the magnetic elements that is movable, and at least a second one of the magnetic elements is a conductor loop.

2. The roller device according to claim 1, wherein the at least one magnetic element that is movable has a displaceability with at least an axial component.

3. The roller device according to claim 1, wherein the at least one displaceable magnetic element is a permanent magnetic element.

4. The roller device according to claim 1, wherein the at least one displaceable magnetic element is an electromagnetic element.

5. The roller device according to claim 1, wherein the magnetic coupling is formed as an eddy current coupling.

6. A traction mechanism drive for driving auxiliary units of a motor vehicle with an input roller element that is connectable to an engine shaft of a motor vehicle engine, at least one output roller device coupled via a common traction mechanism to the input roller element for driving an associated auxiliary unit, and the at least one output roller device is constructed as a roller device according to claim 1.

7. A method for driving an auxiliary unit of a motor vehicle connected via a roller device according to claim 1, comprising at least one of controlling or regulating a rotational speed of the driven shaft of the roller device by displacing of the at least one displaceable magnetic element of the magnetic coupling of the roller device.

8. The roller device according to claim 1, wherein the rest position is an intermediate position between extreme positions at which one of the restoring element and the actuator have a respective maximum effect.

9. The roller device according to claim 1, wherein the restoring element is located opposite the actuator relative to the magnetic element.

10. The roller device according to claim 1, wherein the actuator applies the adjustment force in a directly radial direction.

* * * * *